US 8,876,542 B2
Nov. 4, 2014

(12) United States Patent
Nomura et al.

(54) CONNECTOR AND CONSTRUCTION MACHINE (71) Applicant: Komatsu Ltd., Tokyo (JP)

(72) Inventors: Yoshio Nomura, Hiratsuka (JP);
Tomohiro Yoshino, Hiratsuka (JP);
Kazuo Ohta, Hiratsuka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 113 days.

(21) Appl. No.: 13/813,601

(22) PCT Filed: Nov. 1, 2012

(86) PCT No.: PCT/JP2012/078354
§ 371 (c)(1),
(2), (4) Date: Jan. 31, 2013

(87) PCT Pub. No.: WO2014/020780
PCT Pub. Date: Feb. 6, 2014

(65) Prior Publication Data
US 2014/0148026 A1 May 29, 2014

(30) Foreign Application Priority Data
Jul. 30, 2012 (JP) ................................. 2012-168860

(51) Int. Cl.
H01R 29/00 (2006.01)
H01R 13/703 (2006.01)
(Continued)

(52) U.S. Cl.
CPC ............ *H01R 13/703* (2013.01); *H01R 13/748* (2013.01); *H01R 2201/26* (2013.01); *H01R 13/641* (2013.01); *H01R 13/512* (2013.01); *H01R 13/707* (2013.01); *H01R 2105/00* (2013.01); *E02F 9/2075* (2013.01); *H01R 13/405* (2013.01)
USPC ......................................... 439/188

(58) Field of Classification Search
CPC .. H01R 13/703; H01R 13/405; H01R 13/707; H01R 13/512; H01R 13/748; H01R 13/641; H01R 2201/26; H01R 2105/00; E02F 9/2075
USPC ......................................... 439/188
See application file for complete search history.

(56) References Cited

U.S. PATENT DOCUMENTS

| 8,187,030 B2 * | 5/2012 | Matsuoka et al. ............ 439/542 |
| 2011/0104924 A1 | 5/2011 | Matsuoka et al. |
| 2011/0117784 A1 | 5/2011 | Matsuoka et al. |

FOREIGN PATENT DOCUMENTS

| JP | S54-050194 U1 | 4/1979 |
| JP | 2010272254 A | 12/2010 |

(Continued)

OTHER PUBLICATIONS

International Search Report dated Jan. 29, 2013 from International Application No. PCT/JP2012/078354, 6 pages.

*Primary Examiner* — Javaid Nasri
(74) *Attorney, Agent, or Firm* — Fish & Richardson P.C.

(57) ABSTRACT

A connector for connecting an electric-power-transmission power cable to an electric device installed in a vehicle, includes a device socket, a cable plug that is plugged in or unplugged from the device socket, and a detection switch that is electrically turned on or off by a mechanical contact point provided on the device socket and a mechanical contact point provided on the cable plug. The device socket includes a contact terminal of the detection switch. The cable plug includes a plug housing that is electrically grounded by being connected to the device socket and a cover plate that covers an opening of the plug housing. The cover plate includes an insulative plate body and a contact conductor that contacts with the contact terminal of the detection switch. The plate body and the contact conductor are integrally molded.

5 Claims, 6 Drawing Sheets (51) Int. Cl.
*H01R 13/641* (2006.01)
*H01R 13/707* (2006.01)
*E02F 9/20* (2006.01)
*H01R 13/405* (2006.01)
*H01R 13/74* (2006.01)
*H01R 13/512* (2006.01)
*H01R 105/00* (2006.01)

(56) References Cited

FOREIGN PATENT DOCUMENTS

JP    2011-100611 A    5/2011
JP    2011-108484 A    6/2011

\* cited by examiner

CONNECTOR AND CONSTRUCTION MACHINE

CROSS REFERENCE TO RELATED APPLICATIONS

This application claims priority to Application No. PCT/JP2012/078354, filed on Nov. 1, 2012, which claims priority to Japanese Application No. 2012-168860, filed on Jul. 30, 2012. The entire contents of the above applications are incorporated herein by reference in their entireties.

TECHNICAL FIELD

The present invention relates to a connector and a construction machine, more specifically relates to an improvement in a connector of, for instance, a power cable used in a hybrid construction machine.

BACKGROUND ART

There has been typically known a hybrid construction machine configured such that an engine drives a power generator and a hydraulic pump, the power generator generates electric power to drive an electric rotating motor that rotates an upper revolving body, and the hydraulic pump supplies pressure oil to drive a hydraulic actuator of working equipment and a hydraulic motor of a carrier.

Figure 6:
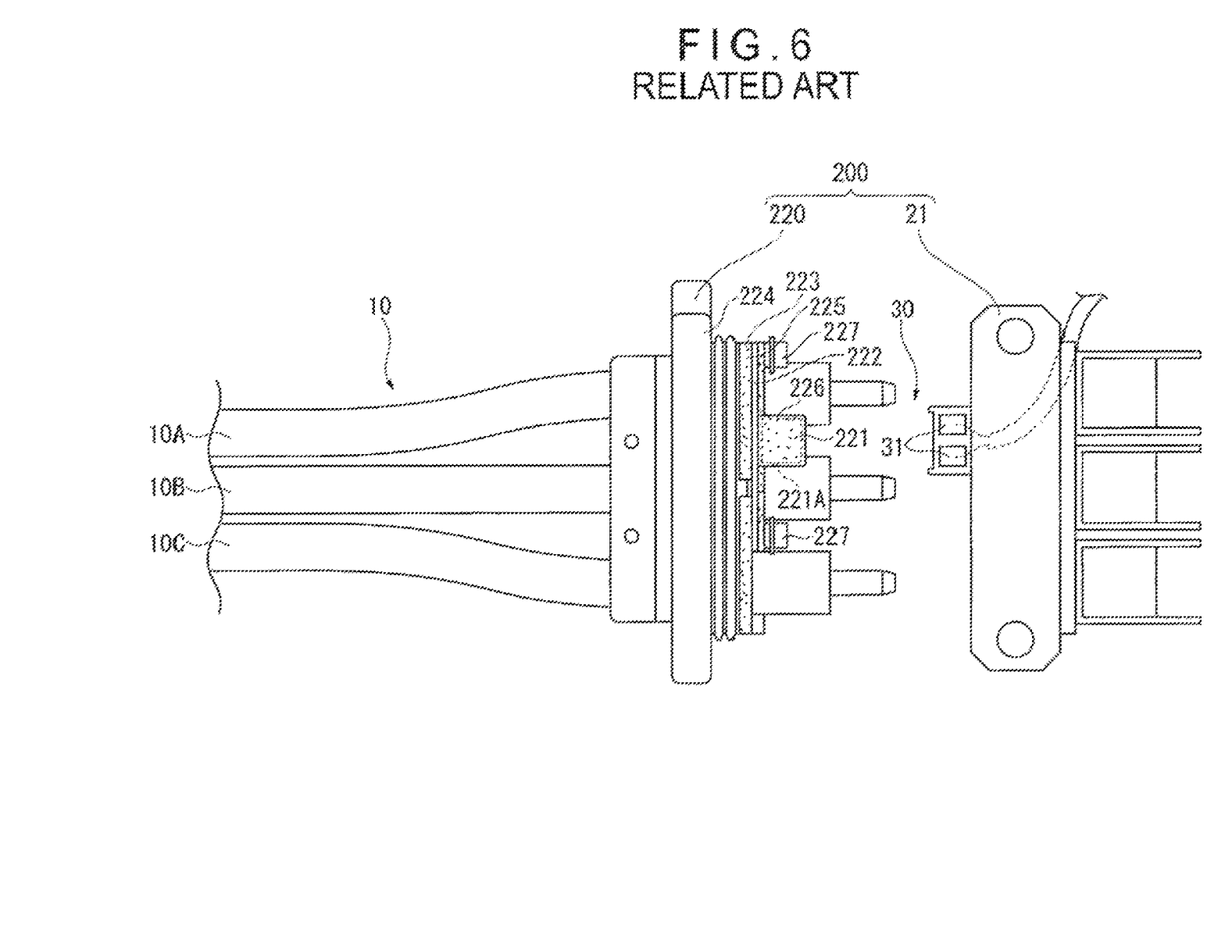
FIG. 6 shows a typical connector.

In such a hybrid construction machine, electric devices to be installed (e.g., a power generator and an inverter, and an electric rotating motor and an inverter) are electrically connected to each other by a power cable (see, for instance, Patent Literature 1). FIG. 6 shows a connector 200 used for connection between the power cable 10 and the electric devices.

The connector 200 includes: a device socket 21 to be attached to an electric device; and a cable plug 220 to be attached to the power cable 10. The connector 200 includes a detection switch 30 for judging a fitting condition of the device socket 21 and the cable plug 220 (FIG. 6 shows an unfitting condition).

The detection switch 30 includes: a pair of contact terminals 31, 31 provided to the device socket 21; and a contact conductor 221 provided to the cable plug 220. In a fitting condition of the device socket 21 and the cable plug 220, the contact terminals 31, 31 are in contact with a contact surface 221A of the contact conductor 221 (i.e., a back surface of the contact conductor 221 in the figure), and the device socket 21 and the cable plug 220 are electrically conducted through the contact surface 221A. Based on an electrically conducting condition between the contact terminals 31, 31 obtained by the detection switch 30, a fitting condition of the connector 200 can be confirmed.

In the connector 200 disclosed in Patent Literature 1, the contact conductor 221 is attached to a cover plate 223 through an insulative plate 222, and the cover plate 223 is attached to a plug housing 224. In this arrangement, the cover plate 223 and the plug housing 224 are conductive, and plug housing 224 is electrically grounded by being fitted to the device socket 21. Accordingly, since the contact conductor 221 is insulated only by the insulative plate 222 in this arrangement, a long electrical clearance cannot be obtained. Depending on situations, the contact conductor 221 may short-circuit to the plug housing 224 through the cover plate 223. For this reason, typically, the cover plate 223 and the contact conductor 221 (except for the contact surface 221A) are respectively coated with insulative coatings 225 and 226 to improve insulation performance.

CITATION LIST

Patent Literature(s)

Patent Literature 1 JP-A-2010-272254

SUMMARY OF THE INVENTION

Problems to be Solved by the Invention

In the connector 200 disclosed in Patent Literature 1, the contact conductor 221 and the cover plate 223 are provided by separate members, and the contact conductor 221 is fixed to the cover plate 223 by a screw 227. Accordingly, it is necessary to reliably prevent conduction from the contact conductor 221 to the cover plate 223 via the screw 227. Consequently, an insulating structure for this purpose becomes complicated to increase the number of components, resulting in time-consuming assembly.

The contact conductor 221 is fastened together with the cover plate 223 to the plug housing 224 by the screw 227. Accordingly, because of fastening the screw 227, the insulative coating 226 may be peeled off from a back surface of the contact conductor 221. In such a case, when water drops reach a peeled part of the insulative coating 226 through the screw 227 during a long-time use under severe conditions, the contact conductor 221 and the screw 227 are electrically conducted through a conductive component precipitated from the peeled part. Consequently, the contact conductor 221 may short-circuit to the plug housing 224 through the screw 227 to cause erroneous detection of the detection switch 30.

An object of the invention is to provide a connector capable of being easily assembled and reliably preventing erroneous detection by a detection switch, and a construction machine including the connector.

Means for Solving the Problems

According to a first aspect of the invention, a connector for connecting an electric-power-transmission power cable to an electric device installed in a vehicle includes: a device socket that is attached to the electric device; a cable plug that is attached to the power cable and is plugged in or unplugged from the device socket; and a detection switch that is electrically turned on or off by a mechanical contact point provided on the device socket and a mechanical contact point provided on the cable plug, in which the device socket includes a contact terminal as the mechanical contact point of the detection switch, the cable plug includes: a plug housing that is electrically grounded by being connected to the device socket; and a cover plate that covers an opening of the plug housing facing the device socket, the cover plate includes: an insulative plate body; and a contact conductor that contacts with the contact terminal as the mechanical contact point of the detection switch, and the plate body and the contact conductor are integrally molded.

In the connector according to a second aspect of the invention, the contact conductor is formed in an L shape and includes: a buried portion that is buried in the plate body in a manner facing the device socket; and a projection that is bent relative to the buried portion and projects toward the device socket from the plate body, and the projection has a contact surface with which the contact terminal contacts.

In the connector according to a third aspect of the invention, the cover plate is fixed to the plug housing by a screw, and a metallic cylindrical collar with which a head of the screw contacts is provided to an insertion hole of the cover plate into which the screw is inserted.

According to a fourth aspect of the invention, the connector further includes a conductive pin contact that is attached to a tip end of the power cable; and an insulative cylindrical holder in the plug housing, the holder receiving an end of the power cable, in which the holder includes: a cylindrical portion that is inserted in an opening hole provided on the cover plate to be retained; and a projection hole through which the pin contact projects.

According to a fifth aspect of the invention, a construction machine includes: the connector according to the above aspects of the invention; and an electric device and a power cable which are connected to each other via the connector.

According to the first and fifth aspect of the invention, since the contact conductor and the plate body are integrally formed, the number of parts can be reduced, thereby facilitating assembly of the connector.

Moreover, since the plate body of the cover plate is made of an insulative material (e.g., synthetic material), even when the cover plate is fixed to the plug housing by a screw and the screw becomes corroded, by separating the screw from the contact conductor, an electrical clearance is reliably ensured by the plate body provided between the screw and the contact conductor, so that short-circuit of the contact conductor to the plug housing is preventable and erroneous detection is reliably preventable.

According to the second aspect of the invention, since the contact conductor includes the buried portion that is bent relative to the projection receiving contact pressure from the contact terminal, and the buried portion is buried in the plate body, even when a large contact pressure works on the contact conductor, there is no fear that the contact conductor drops off the plate body, so that durability of the cover plate and reliability of the detection switch can be improved.

According to the third aspect of the invention, since the metallic collar having a large strength is provided in the insertion hole of the cover plate into which the screw is inserted, in fastening the screw, the head of the screw does not bite the insulative plate body to prevent damage of the cover plate, so that the cover plate can be favorably fixed to the plug housing by a larger fastening torque.

According to the fourth aspect of the invention, since the conductive pin contact projects from the insulative holder and this holder is retained by a similarly insulative cover guide, insulation performance around the pin contact can be reliably secured to improve dielectric strength of the entire cable plug.

DESCRIPTION OF EMBODIMENT(S)

An exemplary embodiment of the invention will be described below with reference to the drawings.

Figure 1:
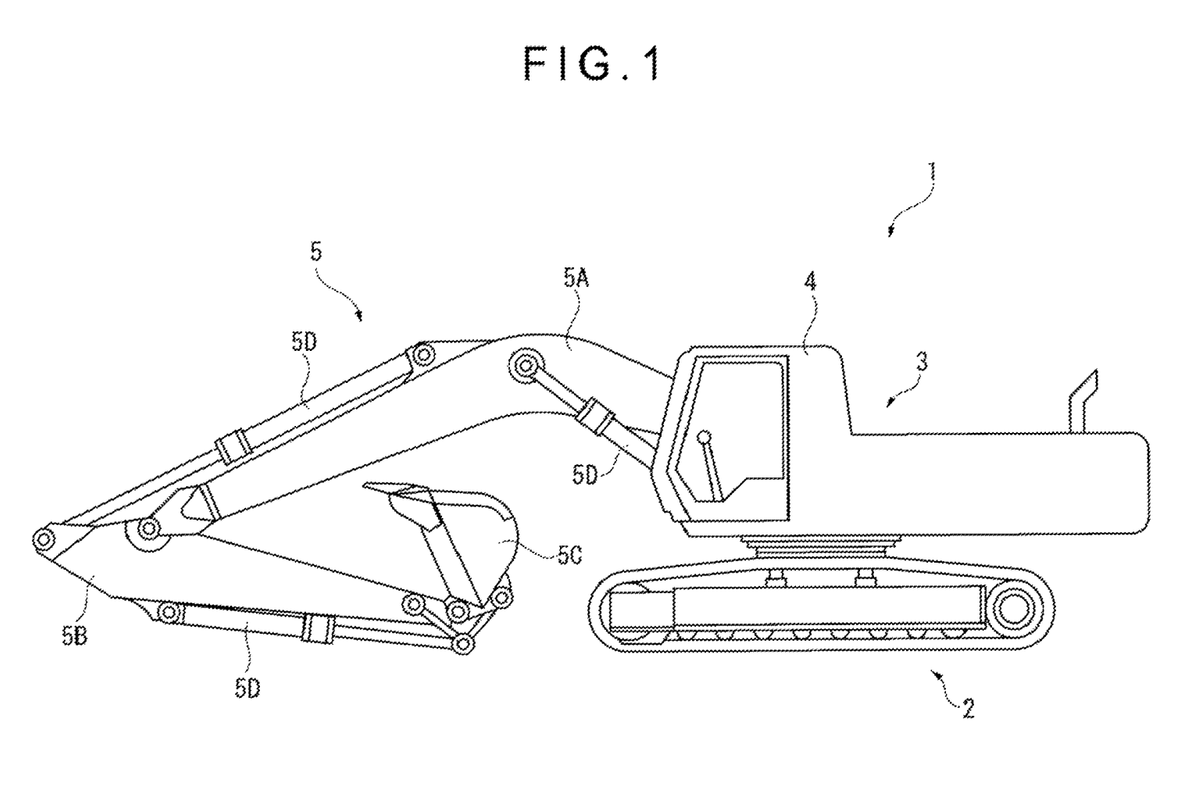
FIG. 1 is a side view showing an appearance of a construction machine according to an exemplary embodiment of the invention.
Figure 2:
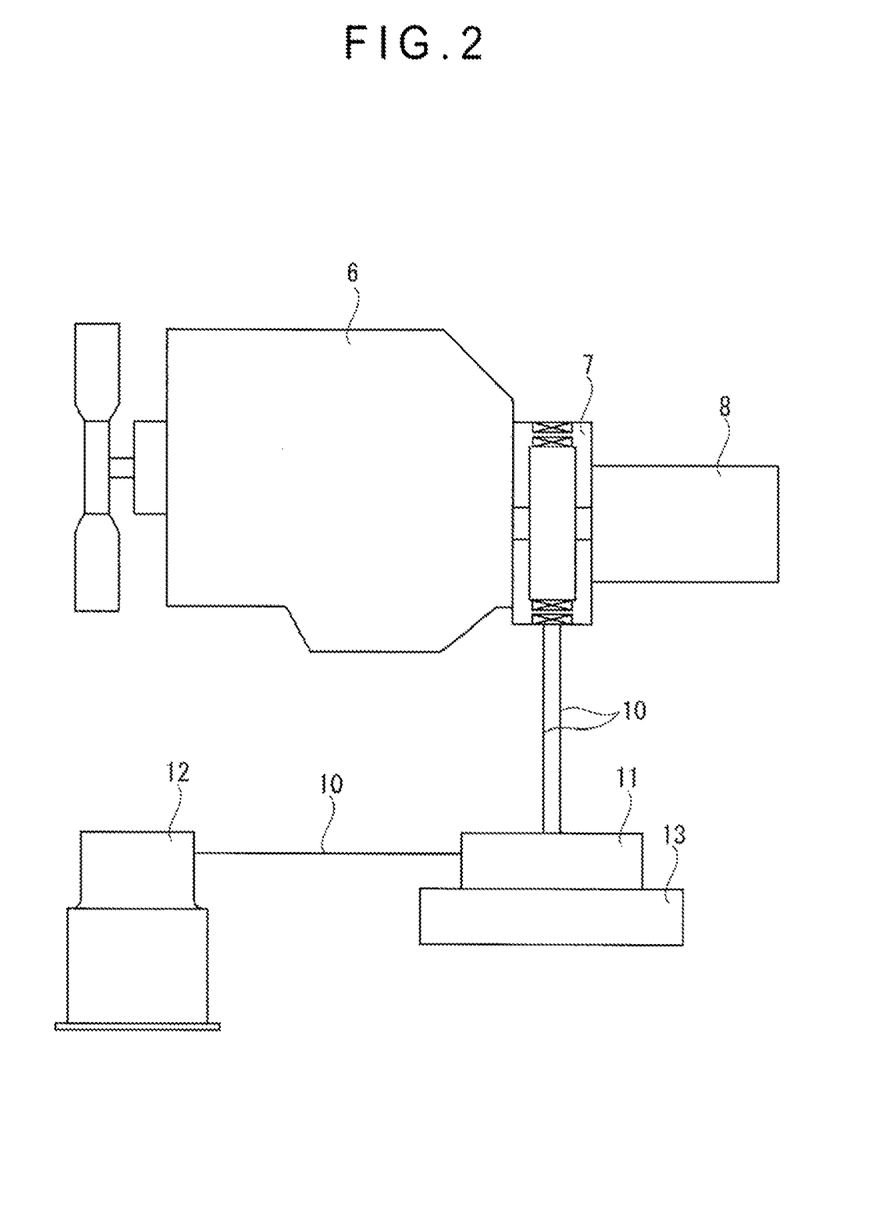
FIG. 2 is a schematic view showing a power source of the construction machine according to the above exemplary embodiment.

FIG. 1 is a side view showing a hybrid excavator 1 as a construction machine according to the exemplary embodiment. FIG. 2 is a schematic view showing a power source used in the construction machine.

As shown in FIG. 1, the hybrid excavator 1 includes: a crawler undercarriage 2; and an upper revolving body 3 rotatably provided on the undercarriage 2. The undercarriage 2 and later-described working equipment 5 are hydraulically driven and the upper revolving body 3 is driven by electric energy, thereby providing a hybrid vehicle.

On the upper revolving body 3, a box-shaped cab 4 for an operator to get in and the working equipment 5 are provided. The working equipment 5 includes a boom 5A, an arm 5B, a bucket 5C and a plurality of hydraulic actuators 5D to drive the boom 5A, the arm 5B and the bucket 5C. In an engine room of the upper revolving body 3, an engine 6 is housed as shown in FIG. 2. A power generator 7 (an electric device) and a hydraulic pump 8 are connected in series to an output shaft of the engine 6. The power generator 7 and the hydraulic pump 8 are driven by the engine 6.

Electric power generated by the power generator 7 is transmitted to an inverter 11 (an electric device) via a power cable 10 for three-phase alternating current. One end of another power cable 10 is connected to the inverter 11 and the other end thereof is connected to an electric rotating motor 12 (an electric device) for driving the upper revolving body 3. A capacitor 13 for storing electric power is also connected to the inverter 11. The electric power generated in the power generator 7 is stored in the capacitor 13 through the inverter 11. In a rotating operation, the stored electric power is supplied from the capacitor 13 to the electric rotating motor 12 through the inverter 11.

On the other hand, a pressure oil from the hydraulic pump 8 is supplied to hydraulic actuators 5D for driving the working equipment 5 and a hydraulic motor for driving the undercarriage 2 (not shown). Note that, since such a hydraulic system is the same as that in a typical hydraulic excavator, a further detailed description and a drawing of the hydraulic system will be herein omitted.

Figure 3:
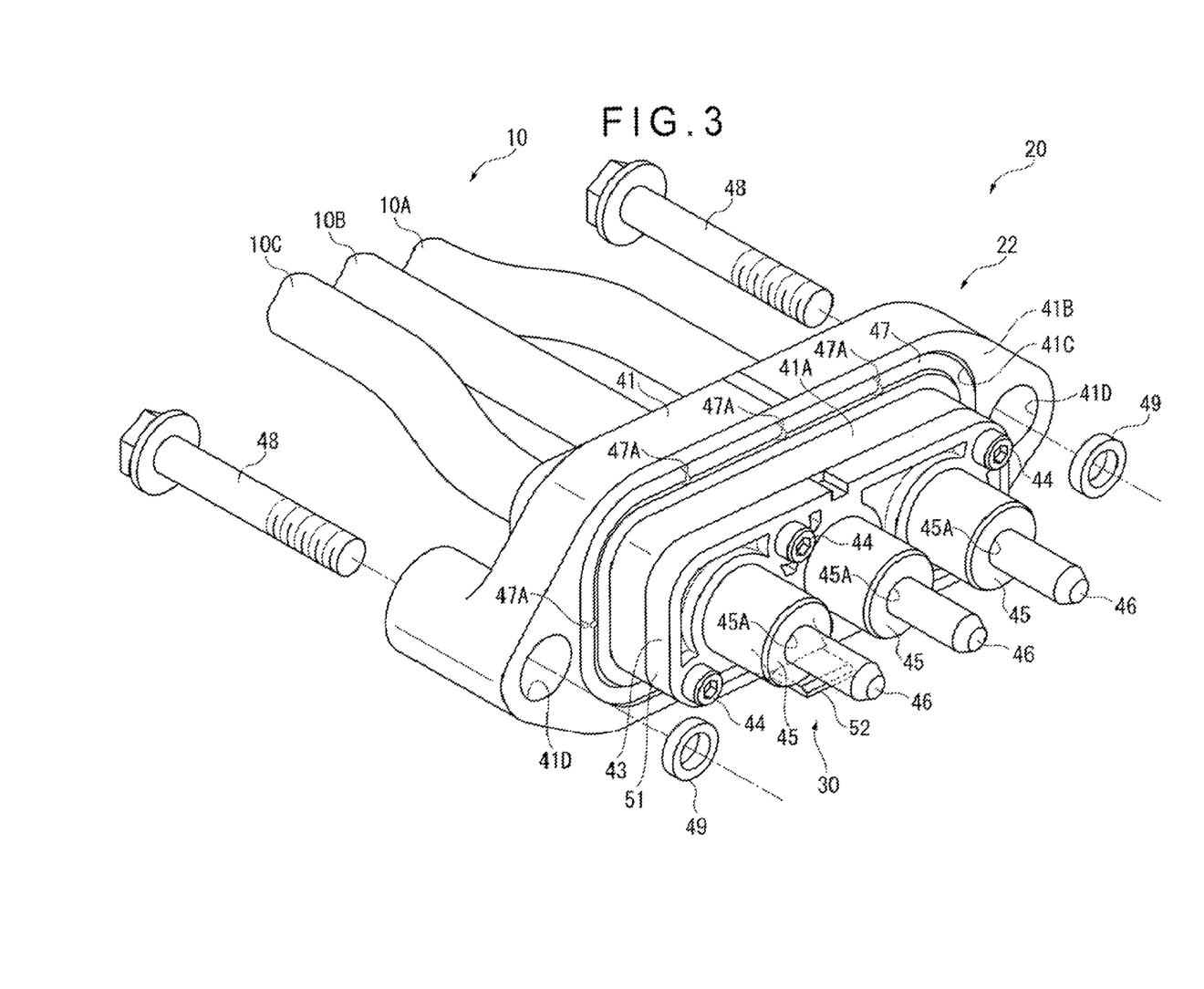
FIG. 3 is a perspective view showing a cable plug for providing a connector according to the above exemplary embodiment.

FIG. 3 shows a cable plug 22 attached to an end of the power cable 10. The cable plug 22 and a device socket 21 shown in FIG. 6 are paired to provide a connector 20. The device socket 21 is the same as a typical one shown in FIG. 6, and a description of the device socket 21 will be herein omitted. As for the cable plug 22, a difference from the cable plug 220 shown in FIG. 6 will be described in details and descriptions of components other than the difference will be simplified.

As shown in FIG. 3, the cable plug 22 includes: a conductive plug housing 41 into which three cables 10A, 10B and 10C of the power cable 10 are inserted; a clump (not shown) that is provided to the plug housing 41 on a side from which the cables are inserted into the plug housing 41, and that pinches the cables 10A, 10B and 10C; and a rectangular cover plate 43 that covers an opening of the plug housing 41 facing the device socket 21 (FIG. 6). The cover plate 43 is fixed to an attachment portion 41A of the plug housing 41 with four screws 44 (only three screws are shown in FIG. 3).

The plug housing 41 includes an insulative cylindrical holder 45 into which an end of the cable 10 (the cables 10A, 10B and 10C) is inserted. The holder 45 has a cylindrical portion inserted into an opening hole 43A (FIG. 4) of the cover plate 43 to be retained and a flange (not shown) integrated with the cylindrical portion and engaged with a back surface of the cover plate 43. A conductive pin contact 46 is attached to a tip end of each of the cables 10A, 10B and 10C to be inserted into the holder 45 in a manner to project through a projection hole 45A provided in the holder 45.

On a contact surface 4113 with an electric device of the plug housing 41, a rounded rectangular groove 41C is provided surrounding the attachment portion 41A. A seal ring 47 is fitted in the groove 41C. When the cable plug 22 is inserted in a plugging/unplugging opening of the electric device and is fitted to the device socket 21 within the plugging/unplugging opening, the contact surface 411 of the plug housing 41 and a contact surface surrounding the plugging/unplugging opening are sealed by the seal ring 47. Herein, the seal ring 47 according to the exemplary embodiment includes a projection 47A that is appropriately positioned in each side of the rectangular seal ring 47. The projection 47A is squeezed into the groove 41C to be elastically deformed, whereby the seal ring 47 is retained in the groove 41C and is prevented from slipping off the groove 41C.

Moreover, the above-described plug housing 41 is fixed to the electric device with a plurality of bolts 48. For this arrangement, the plug housing 41 includes an insertion hole 41D into which each of the bolts 48 is inserted. The bolt 48 inserted in the insertion hole 41D is inserted into a rubber-made locking ring 49. Since the bolt 48 is inserted into the locking ring 49 within the insertion hole 41D to be locked, when the cable plug 22 is unplugged from the electric device, the bolt 48 is prevented from dropping off the plug housing 41.

Figure 4:
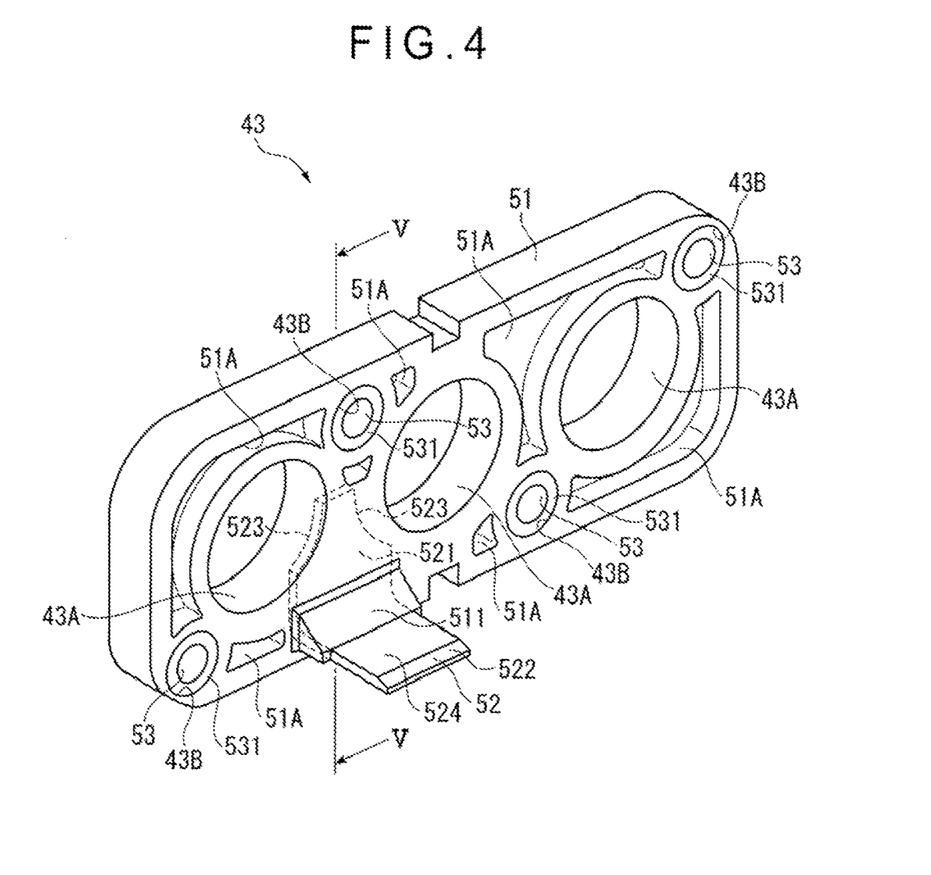
FIG. 4 is an overall perspective view showing a component of the connector.
Figure 5:
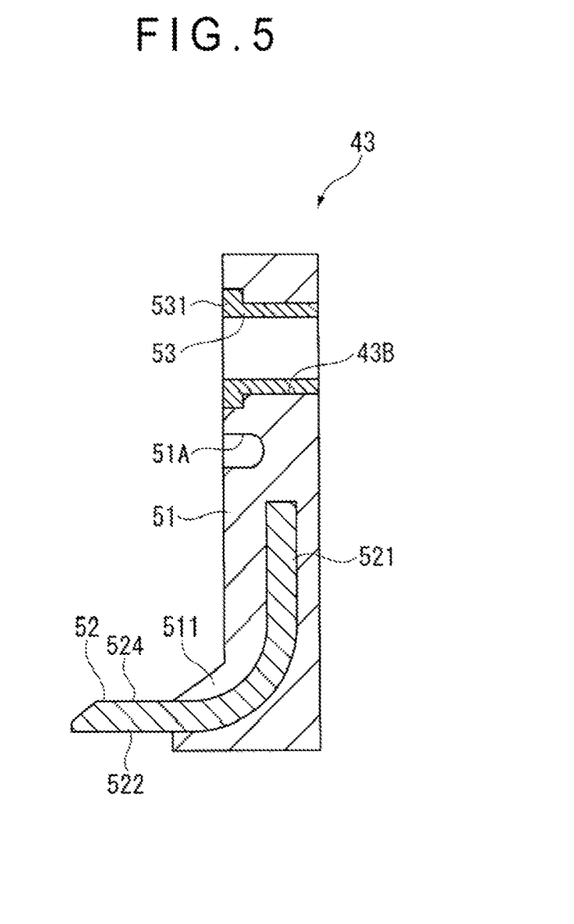
FIG. 5 is a cross-sectional view of the component taken along V-V line in FIG. 4.

The cover plate 43 will be described in more detail below with reference to FIGS. 4 and 5. FIG. 4 is an overall perspective view showing the cover plate 43. FIG. 5 is a cross-sectional view of the cover plate 43 taken along V-V line in FIG. 4.

As shown in FIGS. 4 and 5, the cover plate 43 includes: an insulative synthetic resin-made plate body 51; a contact conductor 52 that contacts with the contact terminals 31, 31 as a mechanical contact point of the detection switch 30 (FIG. 6); and a metallic cylindrical collar 53 that is disposed in each of four insertion holes 43B into each of which a screw 44 (FIG. 3) is inserted. The plate body 51, the contact conductor 52 and the collar 53 are integrally molded by insert molding. Since the entire plate body 51 is insulative, an insulated condition between the contact conductor 52 and the plug housing 41, and an insulated condition between the contact conductor 52 and the collar 53 (i.e., the screw 44) are secured.

The synthetic resin used for the plate body 51 is PBT (polybutylene terephthalate) in this exemplary embodiment, but may be other synthetic resins frequently used for industrial products. Since the plate body 51 only needs to be insulative, a material of the plate body 51 is not limited to the synthetic resins, but may be ceramics and the like.

A metal used for the contact conductor 52 is brass in this exemplary embodiment, but not limited thereto. The metal may be any conductive and corrosion-resistant metals such as copper and stainless steel. The collar 53 is also made of brass in this exemplary embodiment, but only needs to have a predetermined strength and corrosion resistance since conductivity is not required. Alternatively, conductivity and corrosion resistance may be given to the contact conductor 52 and the collar 53 by a surface treatment.

The plate body 51 is provided with a number of recesses 51A in areas except for an outer periphery of the plate body 51, a vicinity of the opening hole 43A and a vicinity of an insertion hole 43B, so that an amount of the resin material is reduced while ensuring a necessary strength of the plate body 51. Three opening holes 43A are aligned along a longitudinal side of the plate body 51. Two of four insertion holes 43B are disposed along a first longitudinal side of the plate body 51 while the other two of the insertion holes 43B are disposed along a second longitudinal side of the plate body 51. As for the insertion holes 43B, ones along the first longitudinal side of the plate body 51 are respectively displaced by substantially a size of the opening hole 43A from ones along the second longitudinal side of the plate body 51.

The contact conductor 52 is formed in an L shape including a buried portion 521 that is buried in the plate body 51 in a manner facing the device socket 21 (FIG. 6) and a projection 522 that is bent relative to the buried portion 521 and projects toward the device socket 21 from the plate body 51.

The buried portion 521 is buried between a pair of adjacent opening holes 43A. The projection 522 projects from the middle of the two insertion holes 43B near either one of the longitudinal sides of the plate body 51. By providing the buried portion 521, retention strength of the contact conductor 52 in the plate body 51 is increased. With this arrangement, there is no fear that the contact conductor 52 drops off the plate body 51 even under a large contact pressure (about 600N) generated by contact between the contact conductor 52 and the contact terminal 31.

The buried portion 521 includes arc-like notches 523, 523 formed corresponding to a shape of an adjacent opening hole 43A. In other words, the notches 523, 523 are provided in order to effectively use a limited buried-area between the opening holes 43A.

As shown in FIGS. 4 and 5, an upper surface of the projection 522 is defined as a contact surface 524 that reliably contacts with both the contact terminals 31, 31 extending over the contact terminals 31, 31. A proximal end of the projection 522 is covered with a reinforcing portion 511 that projects from a surface of the plate body 51. The reinforcing portion 511 reinforces the projection 522 receiving the contact pressure in a cantilevered state to avoid deformation (e.g. curving) of the projection 522.

The collar 53 is provided within the insertion hole 43B with both axial ends exposed from front and back surfaces of the plate body 51. At one of the axial ends of the collar 53, a flange 531 to be brought into contact with a head of the screw 44 (FIG. 3) is provided.

In an arrangement without the collar 53, when fastening torque of the screw 44 is increased, the head of the screw 44 bites the surface of the synthetic resin-made plate body 51 to possibly damage the plate body 51. In this exemplary embodiment, when the screw 44 is inserted into the collar 53 within the insertion hole 43B, the head of the screw 44 is brought into contact with the flange 531 of the metallic collar 53 having a large strength, so that there is no fear of damage on the plate body 51 even when the screw 44 is fastened with a large torque, and the fastening torque is reliably applied on the collar 53 to provide a favorable attachment condition of the cover plate 43 to the plug housing 41.

According to the above-described exemplary embodiment, since the contact conductor 52 and the collar 53 are molded integrally with the plate body 51, the number of components is reducible and the cable plug 22 and, consequently, the connector 20 can be easily assembled.

Since the entire plate body 51 is made of an insulative synthetic resin, no electrically conductive path exists not only on the surface of the plate body 51 but also in an inside thereof. Accordingly, even when water drops get into the collar 53 via the screw 44 to cause the screw 44 or the collar 53 to corrode, since the screw 44 or the collar 53 is separated from the contact conductor 52, an electrical clearance is reliably ensured by the synthetic resin-made plate body 51 provided between the screw 44/the collar 53 and the contact conductor 52, so that short-circuit of the contact conductor 52 to the plug housing 41 is preventable and erroneous detection by the detection switch 30 is reliably preventable.

It should be noted that the invention is not limited to the exemplary embodiments above, but includes modifications and improvements as long as an advantage of some aspects of the invention can be achieved.

In the exemplary embodiment, the construction machine of the invention is described using the hybrid excavator as an example, but not limited thereto. The construction machine may be a hybrid wheel loader, bulldozer, motor grader, dump truck and the like. Further, the invention may be applied not only to a hybrid construction machine but also to an electric construction machine.

A vehicle in which the connector of the invention is installed is not limited to the construction machine, but may be a hybrid car, transport track, or an agricultural vehicle such as a tractor. These vehicles may be not only hybrid vehicles but also electric vehicles.

Although the power cable 10 is for three-phase alternating current in the exemplary embodiment, the invention is applicable to a power cable for single-phase direct current.

Although the collar 53 is also molded integrally with the plate body 51 in the same manner as the contact conductor 52, the collar is not limited to this arrangement. In other words, the collar may be attached in the insertion hole of the molded plate body by press fit, adhesion and the like.

The invention claimed is:

1. A connector for connecting an electric-power-transmission power cable to an electric device installed in a vehicle, comprising:
    a device socket that is attached to the electric device;
    a cable plug that is attached to the power cable and is plugged in or unplugged from the device socket; and
    a detection switch that is electrically turned on or off by a mechanical contact point provided on the device socket and a mechanical contact point provided on the cable plug, wherein
    the device socket comprises a contact terminal as the mechanical contact point of the detection switch,
    the cable plug comprises: a plug housing that is electrically grounded by being connected to the device socket; and a cover plate that covers an opening of the plug housing facing the device socket,
    the cover plate comprises: an insulative plate body; and a contact conductor that contacts with the contact terminal as the mechanical contact point of the detection switch, and
    the plate body and the contact conductor are integrally molded.

2. The connector according to claim 1, wherein
    the contact conductor is formed in an L shape and comprises: a buried portion that is buried in the plate body in a manner facing the device socket; and a projection that is bent relative to the buried portion and projects toward the device socket from the plate body, and
    the projection has a contact surface with which the contact terminal contacts.

3. The connector according to claim 1, wherein
    the cover plate is fixed to the plug housing by a screw, and
    a metallic cylindrical collar with which a head of the screw contacts is provided to an insertion hole of the cover plate into which the screw is inserted.

4. The connector according to claim 1, further comprising:
    a conductive pin contact that is attached to a tip end of the power cable; and
    an insulative cylindrical holder in the plug housing, the holder receiving an end of the power cable, wherein
    the holder comprises: a cylindrical portion that is inserted in an opening hole provided on the cover plate to be retained; and a projection hole through which the pin contact projects.

5. A construction machine comprising:
    the connector according to claim 1; and
    an electric device and a power cable which are connected to each other via the connector.

* * * * *